United States Patent [19]

Ikeda et al.

[11] Patent Number: 5,635,431
[45] Date of Patent: Jun. 3, 1997

[54] SILICON NITRIDE-BASED SINTER

[75] Inventors: Isao Ikeda; Michiyasu Komatsu, both of Yokohama, Japan

[73] Assignee: Kabushiki Kaisha Toshiba, Kanagawa-ken, Japan

[21] Appl. No.: 327,777

[22] Filed: Oct. 24, 1994

[30] Foreign Application Priority Data

Oct. 25, 1993 [JP] Japan .................. 5-266154

[51] Int. Cl.$^6$ .................. C04B 35/587; C04B 35/596
[52] U.S. Cl. .................. 501/97.3; 501/92
[58] Field of Search .................. 501/91, 92, 97, 501/98

[56] References Cited

U.S. PATENT DOCUMENTS

| | | | |
|---|---|---|---|
| 4,615,990 | 10/1986 | Richon et al. | 501/97 X |
| 4,911,870 | 3/1990 | Komatsu et al. | 501/97 X |
| 5,187,127 | 2/1993 | Goto et al. | 501/95 |
| 5,238,885 | 8/1993 | Asayama et al. | 501/92 X |
| 5,384,081 | 1/1995 | Wötting et al. | 901/97 X |
| 5,394,015 | 2/1995 | Tsuzuki et al. | 501/97 |

FOREIGN PATENT DOCUMENTS

| | | |
|---|---|---|
| 59-152270 | 8/1984 | Japan . |
| 63-23153 | 5/1988 | Japan . |
| 63-159256 | 7/1988 | Japan . |

OTHER PUBLICATIONS

Chemical Abstracts, vol. 112, No. 10, Abstract No. 82900m, p. 350, Mar. 5, 1990.

Journal Of The Ceramic Society Of Japan International Edition, vol. 100, No. 7, pp. 925–929, Jul. 7, 1992.

*Primary Examiner*—Karl Group
*Attorney, Agent, or Firm*—Finnegan, Henderson, Farabow, Garrett & Dunner, L.L.P.

[57] ABSTRACT

A silicon nitride-based sinter contains as component elements thereof magnesium in the range of from 0.1 to 1.5% by weight, aluminum in the range of from 0.1 to 3.5% by weight, carbon in the range of from 0.01 to 6% by weight, and oxygen in the range of from 0.2 to 5% by weight, the balance consisting essentially of silicon, nitrogen, and impurities. This sinter is obtained by sintering a ceramic mixture comprising 0.5 to 6% by weight of a $MgO \cdot Al_2O_3$ spinel structure, 0.1 to 20% by weight of silicon carbide, not more than 1% by weight of silicon oxide, and the balance substantially of silicon nitride and impurities. Owing to the incorporation of the $MgO \cdot Al_2O_3$ spinel structure and silicon carbide, the produced silicon nitride-based ceramic acquires an outstanding ability to resist corrosion caused by such chemicals as acids and alkalis (resistance to chemicals) without impairing such inherent characteristic properties of silicon nitride as strength, resistance to abrasion, and resistance to heat.

6 Claims, No Drawings

SILICON NITRIDE-BASED SINTER

BACKGROUND OF THE INVENTION

1. Field of the Invention

This invention relates to a silicon nitride-based sinter which excels as in resistance to chemicals.

2. Description of the Related Art

Ceramic sinters having silicon nitride as a main component thereof possess various ideal properties such as very high heat resistance, a small thermal expansion coefficient, and excellent resistance to thermal shock. Thus, attempts are being made to use these ceramic sinters in engine parts, machine parts made of steel, etc. as high-temperature structural materials in the place of conventional heat-resistant alloys. Further, since they excel in frictional resistance, efforts are being continued to realize the use of these ceramic sinters in sliding members and cutting tools.

Generally, silicon nitride is a ceramic material possessing a very poor sintering property. Thus, the silicon nitride powder prepared as a raw material for sintering has the sintering property thereof improved by having such a sintering auxiliary as a rare earth element oxide or aluminum oxide incorporated in a prescribed amount therein so as to permit production of a ceramic sinter having high density and high strength. As concrete examples of the sintering composition (raw material composition) for silicon nitride-based ceramics, such as the $Si_3N_4$—$Y_2O_3$ composition, the $Si_3N_4$—$Y_2O_3$—$Al_2O_3$—AlN composition, and the $Si_3N_4$—$Y_2O_3$—$Al_2O_3$ oxide of Ti,Mg or Zr composition have been known heretofore.

In the sintering compositions mentioned above, yttrium oxide and other similar rare earth element oxides and aluminum oxide perform the function of exalting the sintering property of silicon nitride and enhancing the densification of the sinter of silicon nitride. The silicon nitride-based sinters manufactured from raw materials incorporating a rare earth element oxide or aluminum oxide have a dense texture and excel in mechanical strength properties. Measures have been adopted to improve the mechanical properties and the frictional resistance manifested by silicon nitride sinters at elevated temperatures by causing the raw material powder to incorporate therein a combination of a plurality of kinds of compounds such as aluminum nitride and titanium oxide.

The silicon nitride-based sinters which have such sintering compositions as mentioned above, however, are invariably deficient in resistance to corrosion caused by such chemicals as acids and alkalis. When they are adopted as structural materials which are destined to be used in an environment having such chemicals contained therein, therefore, they pose the problem of providing neither expected durability nor reliability. Particularly, the rare earth oxides are at a disadvantage in readily yielding to corrosion by such chemicals as acids or alkalis and consequently inducing serious degradation of the strength of silicon nitride-based sinters, though they manifest a conspicuous effect in densifying silicon nitride.

As concrete examples of the silicon nitride-based sinter using no rare earth element oxide, sinters using 0.5 to 5 parts by weight of spinel and 0.5 to 5 parts by weight of titanium carbonate as sintering auxiliaries (JP-B2; 63-23,153) and silicon nitride-based sinters obtained by using a mixture of silicon oxide with silicon carbide not as sintering auxiliaries but as a starting raw material and subjecting this raw material to reactive sintering in an atmosphere of nitrogen gas (JP-A-59-152,270) have been known to date. Though these silicon nitride-based sinters exhibit high strength at elevated temperatures, they are not intended at all for the improvement of resistance to chemicals (resistance to corrosion) and they actually offer no sufficient resistance to chemicals. Further, composite sinters of silicon nitride and silicon carbide (JP-A-63-159,256) have been known heretofore. Since the manufacture of these composite sinters necessitates use of yttrium oxide and other rare earth element oxides as sintering auxiliaries, the composite sinters naturally offer no sufficient resistance to chemicals.

Sinters made of β-Sialon as the raw material are widely used as materials capable of exhibiting relatively high resistance to chemicals. Since they are deficient in mechanical properties, they have the disadvantage of having only a limited range of utility.

In recent years, the demand has increased for heat resisting members and abrasion resisting members which are usable under an atmosphere attended by chemical substances has been growing. For uses of this nature, the corrosion-proof heat-resistant alloys and heat-resistant hard metals which have been heretofore in popular use are not easily adapted. Thus, the appearance of ceramic sinters which excel metals in resistance to heat and resistance to abrasion and offer excellent resistance to chemicals (proofness against corrosion) as well has been earnestly longed for.

SUMMARY OF THE INVENTION

The object of this invention, therefore, is to provide a silicon nitride-based sinter which exhibits excellent proofness against corrosion caused by such chemicals as acids and alkalis (resistance to chemicals) and avoids impairing the characteristics, i.e. strength, resistance to abrasion, and resistance to heat, inherent in silicon nitride.

The present inventors have continued various studies on auxiliaries fit for addition to the raw material for sintering in respect of the kind and quantity thereof and, as a result, have found that a silicon nitride sinter excelling in resistance to chemicals and suffering only sparingly from decline of strength is obtained by having at least a $MgO.Al_2O_3$ structure and silicon carbide incorporated as auxiliaries in suitable amounts in the raw material of silicon nitride for sintering.

This invention has been perfected on the basis of this knowledge. The silicon nitride-based sinter of this invention is characterized by containing as component elements thereof magnesium in the range of from 0.1 to 1.5% by weight, aluminum from 0.1 to 3.5% by weight, carbon from 0.01 to 6% by weight, and oxygen from 0.2 to 5% by weight and having the balance composed substantially of silicon, nitride, and impurities. Further, the silicon nitride-based sinter mentioned above is characterized by additionally containing as a component element at least one member selected from among titanium, hafnium, and tungsten in the range of from 0.1 to 3.8% by weight.

The silicon nitride-based sinter which defines the present invention in terms of the composition of the starting material thereof is characterized by being produced by sintering a ceramic mixture comprising 0.5 to 6% by weight of a $MgO.Al_2O_3$ spinel structure, 0.1 to 20% by weight of silicon carbide, not more than 1% by weight of silicon oxide, and the balance substantially of silicon nitride and impurities. It is also characterized by being produced by sintering a ceramic mixture further comprising 0.1 to 4% by weight of at least one compound selected from among the oxides and carbides of titanium, hafnium, and tungsten.

During the manufacture of the silicon nitride-based sinter of this invention, the $MgO.Al_2O_3$ spinel structure which is added to the raw material of silicon nitride not only functions as an agent for promoting sintering but also discharges the role of forming a grain boundary phase exhibiting strong resistance particularly to chemicals and consequently imparting improved resistance to chemicals to the produced sinter. Thus, it is incorporated in an amount in the range of from 0.5 to 6% by weight in the powdered raw material (ceramic mixture). If the amount thereof to be added is less than 0.5% by weight, the produced sinter will be deficient in the outcome of textural densification and the characteristics inherent in silicon nitride will be impaired. Conversely, if this amount exceeds 6% by weight, the resistance offered by the sinter to chemicals will decrease in proportion as the excess increases. Preferably, the amount of the $MgO.Al_2O_3$ spinel structure to be added ranges from 2 to 5% by weight. In addition to the $MgO.Al_2O_3$ spinel structure which is intentionally added as an agent for promoting sintering, the $MgO.Al_2O_3$ spinel structure, which is formed in the sinter at least after the step of sintering, is effectively utilized in this invention. The utilization thereof is also embraced in this invention. Adding $MgO.Al_2O_3$ spinel is preferable to adding MgO and $Al_2O_3$ independently during the course of manufacturing of the sinter not only to excel in resistance against chemicals, but also to promote silicon nitride to be denser by lowering the melting point of the sinter. By adding MgO and $Al_2O_3$ in the form of $MgO.Al_2O_3$ spinel instead of adding them independently of each other preferably during the course of manufacture of the sinter, the compaction of silicon nitride is promoted to a greater extent because the $MgO.Al_2O_3$ spinel not only excels in resistance to chemicals but also fulfills the role of lowering the melting point of the sinter.

The silicon carbide which is added as another component to the raw material of silicon nitride not only manifests an effect in heightening the resistance to chemicals but also contributes to improve mechanical properties, particularly hardness, of the silicon nitride-based ceramic and accomplishes the object of imparting high rigidity to the sinter. It also manifests an effect in alleviating resistance to friction under a condition devoid of a lubricant such as in the mass of a chemical compound. It is incorporated in the powdered raw material in an amount in the range of from 0.1 to 20% by weight. If the amount of silicon carbide to be added is less than 0.1% by weight, the added compound will not sufficiently manifest the effect of improving the mechanical properties and the effect of alleviating the resistance to friction. Conversely, if this amount exceeds 20% by weight, the added compound will rather go to impair the sintering property of the raw material. Preferably, the amount of addition is in the range of from 1 to 10% by weight.

The silicon nitride sinter of this invention is enabled, by the use of the $MgO.Al_2O_3$ spinel structure and silicon carbide as an auxiliary in combination with silicon nitride, to acquire outstanding characteristics in respect of mechanical strength and resistance to abrasion as well as an excellent ability to resist chemicals.

In the silicon nitride-based sinter of this invention, the ability thereof to resist chemicals can be further improved by adding silicon oxide to the raw material of silicon nitride. The silicon oxide not merely excels in its own ability to resist chemicals but also manifests an effect of strengthening the union between silicon nitride particles and other auxiliaries and enabling the produced sinter to offer heightened resistance to chemicals. Though silicon oxide is not always required to be incorporated, it is desired to be added for the purpose of producing such effects as mentioned above. When silicon oxide is added at all, the amount thereof to be added is not more than 1% by weight. If the amount of silicon oxide to be added exceeds 1% by weight, the excess of the compound impairs the sintering property of the raw material. The amount of silicon oxide to be added is desired to be in the range of from 0.2 to 1% by weight, preferably from 0.2 to 0.6% by weight.

Besides the additive auxiliaries mentioned above, the ceramic mixture to be used in this invention may incorporate therein at least one compound selected from among the oxides and carbides of Ti, Hf, and W in an amount in the range of from 0.1 to 4% by weight. These compounds of Ti, Hf, and W are capable of synergistically acting with the $MgO.Al_2O_3$ spinel structure and functioning as a sinter promoting agent for promoting textural densification of the sinter. After the sintering, they are dispersed in the form of independent particles of high melting compounds within the texture of the sinter and enabled to improve the sinter in respect to the strength and the resistance to abrasion. The compounds of Ti, Hf, and W are desired to be incorporated in an amount in the range of from 0.1 to 4% by weight in the powdered raw material. If the amount so added is less than 0.1% by weight, the added compounds will be meagerly effective in promoting the sintering property of the raw material and improving the strength properties of the produced sinter. Conversely, if this amount exceeds 4% by weight, the produced sinter will be deficient in the ability to resist chemicals. For the sake of enabling the produced sinter to retain the mechanical strength and the resistance to chemicals, it is more desirable that the compounds be added in an amount in the range of from 1 to 2% by weight.

The contents of the component elements of the silicon nitride-based sinter of this invention are defined for the same reasons as the amounts of the aforementioned additive components to be incorporated are defined. If the content of Mg is less than 0.1% by weight or the content of Al is less than 0.1% by weight, for example, the produced sinter will not be vested with any ideal ability to resist chemicals and will suffer from a decrease in the textural density. Conversely, if the content of Mg exceeds 1.5% by weight or the content of Al exceeds 3.5% by weight, the produced sinter will be deficient in the ability to resist chemicals. Though Mg and Al are basically contained in such a ratio as to form a $MgO.Al_2O_3$ spinel structure, a slight deviation of this ratio during the course of sintering is tolerated by this invention. The content of oxygen is defined for substantially the same reason as the content of Mg and Al mentioned above and is in the range of from 0.2 to 5% by weight. Then, C is added in the form of silicon carbide. If the content of C is less than 0.01% by weight, the produced sinter will not be vested with a sufficient increase in either the mechanical properties or the ability to resist chemicals. Conversely, if this content exceeds 6% by weight, the excess will bring about a decrease in the textural density of the sinter. The same remarks hold good for Ti, Hf, and W.

The silicon nitride-based sinter of this invention is manufactured by the method of production shown below, for example.

A raw material mixture (ceramic mixture) is prepared by adding a $MgO-Al_2O_3$ spinel structure, silicon carbide, and silicon oxide and, when necessary, further adding at least one compound selected from among the oxides and carbides of Ti, Hf, and W in prescribed amounts to the raw material of silicon nitride. Then, the raw material mixture is molded in a desired shape (molded ceramic mass) by the well-known method using a metallic press, for example. This molded mass is sintered in an atmosphere of such an inert gas as nitrogen gas or argon gas at a temperature in the approximate range of from 1700° to 1800° C. for a prescribed time. This sintering operation may be implemented by the normal pressure sintering method or by any of the other sintering methods such as, for example, the hot press method, the ambient pressure method, and the hot hydrostatic press (HIP) method. Without reference to the kind of sintering method to be adopted, the silicon nitride-based sinter which is consequently obtained has high textural density and mechanical strength and exhibits an excellent ability to resist corrosion (resistance to chemicals) under a working environment attended particularly by such chemicals as acids or alkalis.

DESCRIPTION OF THE PREFERRED EMBODIMENTS

Now, this invention will be described more specifically below with reference to working examples.

EXAMPLE 1

A mixture consisting of 92% by weight of an α-phase type silicon nitride powder having an average particle diameter of 0.7 μm, 4% by weight of a MgO.Al$_2$O$_3$ spinel structure powder having an average particle diameter of 0.8 μm, 3.4% by weight of a silicon carbide powder having an average particle diameter of 0.5 μm, and 0.6% by weight of a silicon oxide powder having an average particle diameter of 0.7 μm was mixed in ethanol as a solvent in a ball mill for 48 hours to produce a homogeneous raw material mixture (ceramic mixture).

Then, the raw material mixture thus obtained and a prescribed amount of an organic binder added thereto were uniformly mixed and compression molded with a molding pressure of 1000 kgf/cm$^2$ to produce a molded piece measuring 50 mm×50 mm×5 mm. Subsequently, the molded piece was degreased in an atmosphere of nitrogen gas at a temperature of 500° C. The degreased piece was subjected to normal pressure sintering in an atmosphere of nitrogen gas at 1800° C. for two hours to obtain a silicon nitride-based sinter. The component elements contained in this silicon nitride-based sinter were 0.7% by weight of Mg, 1.5% by weight of Al, 2.5% by weight of O, 1.0% by weight of C, 57.5% by weight of Si, 36.8% by weight of N, and 0.01% by weight of impurities (such as Fe).

Separately, for comparison with this invention, a silicon nitride-based sinter (Comparative Example 1) was obtained by repeating the same operations of mixing, molding, degreasing, and sintering as involved in the procedure of Example 1 described above while using 2% by weight of a yttrium oxide powder having an average particle diameter of 0.9 μm and 2% by weight of an aluminum oxide powder having an average particle diameter of 0.9 μm in the place of the MgO.Al$_{2O3}$ spinel structure powder.

The silicon nitride-based sinters obtained respectively in Example 1 and Comparative Example 1 as described above were tested for density, bending strength at normal room temperature, and disruptive strength. In order to evaluate the ability to resist chemicals, the samples were immersed in an aqueous 30% HCl solution, heat-treated therein at 90° C. for 100 hours, and thereafter tested for loss of weight and bending strength. The results are shown in Table 1.

TABLE 1

| | Relative density (%) | Bending strength (kgf/mm$^2$) | Disruptive strength (MPa m$^{1/2}$) | Loss of weight after immersion in HCl (%) | Bending strength after immersion in HCl (kgf/mm$^2$) |
|---|---|---|---|---|---|
| Ex 1 | 99.8 | 103 | 6.8 | 0.009 | 94 |
| CE 1 | 99.8 | 100 | 6.6 | 0.105 | 60 |

Note) Ex = Ex = Example CE = Comparative Example

It is clearly noted from the results of the test given in Table 1 that the silicon nitride-based sinter of Example 1 excelled in such mechanical properties as bending strength and disruptive strength and, in respect of properties after the treatment of immersion in the aqueous HCl solution, this sinter showed a smaller loss of weight and better mechanical properties than the sinter of Comparative Example 1 which incorporated yttrium oxide.

EXAMPLES 2 TO 15 AND COMPARATIVE EXAMPLES 2 TO 5:

Raw material mixtures were prepared by mixing the same silicon nitride powder, MgO.Al$_2$O$_3$ spinel structure powder, silicon carbide powder, silicon oxide powder, and oxide or carbide powders of Ti, Hf, and W as used in Example 1 in amounts to form the composition ratios shown in Table 2. Then, the raw material mixtures thus obtained were subjected to the same operations of molding, degreasing, and sintering as involved in the procedure of Example 1 to produce silicon nitride-based sinters.

In Comparative Experiments 2 to 5, raw material mixtures containing silicon carbide, a MgO.Al$_{2O3}$ spinel structure, silicon oxide, and titanium oxide respectively in excess amounts were prepared and subjected to the same operations of mixing through sintering as involved in the procedure of Example 1 to produce silicon nitride-based sinters.

TABLE 2

| | Raw material composition (% by weight) | | | |
|---|---|---|---|---|
| | Si$_3$N$_4$ | Spinel | SiC | Other components |
| Ex 2 | 91.5 | 4 | 5 | SiO$_2$: 0.5 |
| Ex 3 | 79.5 | 5 | 15 | SiO$_2$: 0.5 |
| Ex 4 | 95.0 | 3 | 1.5 | SiO$_2$: 0.5 |
| Ex 5 | 91.2 | 3 | 5 | SiO$_2$: 0.8 |
| Ex 6 | 92.8 | 3 | 4 | SiO$_2$: 0.2 |
| Ex 7 | 92.2 | 4 | 4 | — |
| Ex 8 | 82.0 | 6 | 12 | — |
| Ex 9 | 95.0 | 1.5 | 3 | SiO$_2$: 0.5 |
| Ex 10 | 90.6 | 3 | 5 | SiO$_2$: 0.4, TiO$_2$: 1 |
| Ex 11 | 88.2 | 3 | 5 | SiO$_2$: 0.3, TiO$_2$: 3.5 |
| Ex 12 | 93.8 | 3 | 3 | TiO$_2$: 0.2 |
| Ex 13 | 91.0 | 4 | 3 | SiO$_2$: 0.5, TiC: 1.5 |
| Ex 14 | 89.0 | 4 | 5 | SiO$_2$: 0.5, WC: 1.5 |
| Ex 15 | 90.0 | 4 | 4 | SiO$_2$: 0.5, HfO$_2$: 1.5 |
| CE 2 | 64.5 | 5 | 30 | SiO$_2$: 0.5 |
| CE 3 | 84.5 | 10 | 5 | SiO$_2$: 0.5 |
| CE 4 | 90.0 | 3 | 5 | SiO$_2$: 2.0 |
| CE 5 | 83.5 | 3 | 5 | SiO$_2$: 0.5, TiO$_2$: 8 |

Note) Ex = Example CE = Comparative Example

The silicon nitride-based sinters obtained in Examples 2 to 15 and Comparative Examples 2 to 5 as described above were tested for density, bending strength, and hardness in the same manner as in Example 1 and, at the same time, subjected to an immersion treatment in the aqueous HCl solution and, after the treatment, tested for weight loss and bending strength. The results are shown in Table 3.

TABLE 3

| | Relative density (%) | Bending strength (kgf/mm$^2$) | Disruptive strength (MPa m$^{1/2}$) | hardness | Loss of weight after immersion in HCl (%) | Bending strength after immersion in HCl (kgf/mm$^2$) |
|---|---|---|---|---|---|---|
| Ex 2 | 99.8 | 110 | 6.9 | 1520 | 0.006 | 100 |
| Ex 3 | 99.7 | 100 | 6.8 | 1560 | 0.009 | 92 |
| Ex 4 | 99.8 | 108 | 6.8 | 1500 | 0.005 | 97 |
| Ex 5 | 99.7 | 105 | 6.7 | 1490 | 0.005 | 96 |
| Ex 6 | 99.8 | 110 | 6.8 | 1500 | 0.010 | 94 |
| Ex 7 | 99.8 | 109 | 7.0 | 1510 | 0.013 | 94 |
| Ex 8 | 99.8 | 115 | 6.9 | 1550 | 0.016 | 92 |
| Ex 9 | 99.6 | 103 | 6.7 | 1500 | 0.004 | 92 |
| Ex 10 | 99.8 | 117 | 6.9 | 1520 | 0.007 | 99 |
| Ex 11 | 99.7 | 125 | 7.0 | 1500 | 0.020 | 97 |
| Ex 12 | 99.8 | 108 | 7.0 | 1490 | 0.017 | 93 |
| Ex 13 | 99.7 | 112 | 7.1 | 1520 | 0.008 | 95 |
| Ex 14 | 99.8 | 115 | 7.1 | 1550 | 0.006 | 100 |
| Ex 15 | 99.8 | 110 | 7.2 | 1500 | 0.006 | 97 |
| CE 2 | 95.5 | 82 | 6.2 | 1620 | 0.019 | 71 |
| CE 3 | 99.8 | 115 | 7.1 | 1490 | 0.042 | 76 |
| CE 4 | 97.0 | 88 | 6.4 | 1430 | 0.020 | 79 |
| CE 5 | 99.8 | 110 | 7.0 | 1510 | 0.045 | 72 |

Note) Ex = Example CE = Comparative Example

The test results shown in Table 3 clearly indicate that the sinters of Examples 2 to 15 incorporating the spinel structure and silicon carbide and optionally further incorporating oxides or carbides of Ti, Hf, and W in prescribed amounts invariably exhibit high mechanical properties and excel in resistance to chemicals.

It is clearly noted from the working examples cited above that the silicon nitride-based sinter of this invention is enabled to acquire enhanced resistance to corrosion caused by various chemicals and, at the same time, attain improved mechanical properties without impairing the ability to resist abrasion inherently owned by the silicon nitride ceramic particularly because the spinel structure forms a grain boundary phase excelling in resistance to chemicals in the texture of the produced sinter. Thus, this invention realizes provision of silicon nitride-based sinters which are highly useful as in high-strength abrasion-resistant and chemical-resistant members capable of taking the place of the conventional corrosion-resistant heat-resistant alloys and heat-resistant hard metals heretofore used for forming gas turbine parts, etc.

What is claimed is:

1. A silicon nitride-based sinter having a composition consisting essentially of magnesium in the range of from 0.1 to 1.5% by weight, aluminum in the range of from 0.1 to 3.5% by weight, carbon in the range of from 0.01 to 6% by weight, oxygen in the range of from 0.2 to 5% by weight, and the balance silicon, nitrogen, and impurities, wherein said magnesium and said aluminum are mainly present in said sinter in the form of a MgO.Al$_2$O$_3$ spinel structure.

2. A silicon nitride-based sinter having a composition consisting essentially of magnesium in the range of from 0.1 to 1.5% by weight, aluminum in the range of from 0.1 to 3.5% by weight, carbon in the range of from 0.01 to 6% by weight, oxygen in the range of from 0.2 to 5% by weight, 0.1 to 3.8% by weight of at least one member selected from the group consisting of titanium, hafnium, and tungsten, and the balance silicon, nitrogen, and impurities, wherein said magnesium and said aluminum are mainly present in sSaid sinter in the form of a MgO.Al$_2$O$_3$ spinel structure.

3. A silicon nitride-based sinter produced by sintering a ceramic mixture consisting essentially of 0.5 to 6% by weight of a MgO.Al$_2$O$_3$ spinel structure, 0.1 to 20% by weight of silicon carbide, 1% by weight or less of silicon oxide, and the balance silicon nitride and impurities.

4. A silicon nitride-based sinter according to claim 3, wherein said ceramic mixture contains said silicon oxide in the range of from 0.2 to 1% by weight.

5. A silicon nitride-based sinter according to claim 3, wherein said ceramic mixture contains 2 to 5% by weight of said MgO.Al$_2$O$_3$ spinel structure, 1 to 10% by weight of said silicon carbide, and 0.2 to 1% by weight of said silicon oxide.

6. A silicon nitride-based sinter produced by sintering a ceramic mixture consisting essentially of 0.5 to 6% by weight of a MgO.Al$_2$O$_3$ spinel structure, 0.1 to 20% by weight of silicon carbide, 1% by weight or less of silicon oxide, 0.1 to 4% by weight of at least one member selected from the group consisting of titanium, hafnium, and tungsten, and the balance silicon nitride and impurities.

* * * * *

UNITED STATES PATENT AND TRADEMARK OFFICE
CERTIFICATE OF CORRECTION

PATENT NO. : 5,635,431  
DATED : June 3, 1997  
INVENTOR(S) : Isao Ikeda et al

It is certified that error appears in the above-indentified patent and that said Letters Patent is hereby corrected as shown below:

On the Title page item [57], lines 8 and 12, "$MgO.Al_2O_3$" should read --$MgO·Al_2O_3$--.

Column 2, lines 43 and 63 "$MgO.Al_2O_3$" should read --$MgO·Al_2O_3$--.

Column 3, Line 4, "$MgO.Al_2O_3$" should read --$MgO·Al_2O_3$--.

Column 3, Line 18, "$MgO.Al_2O_3$" should read --$MgO·Al_2O_3$--.

Column 3, Line 20, "$MgO.Al_2O_3$" should read --$MgO·Al_2O_3$--.

Column 3, Line 22, "$MgO.Al_2O_3$" should read --$MgO·Al_2O_3$--.

Column 3, Line 25, "$MgO.Al_2O_3$" should read --$MgO·Al_2O_3$--.

Column 3, Line 30, "$MgO.Al_2O_3$" should read --$MgO·Al_2O_3$--.

UNITED STATES PATENT AND TRADEMARK OFFICE
CERTIFICATE OF CORRECTION

PATENT NO. : 5,635,431
DATED : June 3, 1997
INVENTOR(S) : Isao Ikeda et al

It is certified that error appears in the above-indentified patent and that said Letters Patent is hereby corrected as shown below:

Column 3, Line 34, "MgO.Al$_2$O$_3$" should read --MgO·Al$_2$O$_3$--.

Column 3, Line 56, "MgO.Al$_2$O$_3$" should read --MgO·Al$_2$O$_3$--.

Column 4, Line 17, "MgO.Al$_2$O$_3$" should read --MgO·Al$_2$O$_3$--.

Column 4, Line 47, "MgO.Al$_2$O$_3$" should read --MgO·Al$_2$O$_3$--.

Column 4, Line 63, "MgO-Al$_2$O$_3$" should read --MgO·Al$_2$O$_3$--.

Column 5, Line 28, "MgO.Al$_2$O$_3$" should read --MgO·Al$_2$O$_3$--.

Column 5, Line 59, "MgO.Al$_{203}$" should read --MgO·Al$_2$O$_3$--.

Column 6, Line 25, "MgO.Al$_2$O$_3$" should read --MgO·Al$_2$O$_3$--.

Column 6, Line 34, "MgO.Al$_{203}$" should read -- MgO·Al$_2$O$_3$--.

UNITED STATES PATENT AND TRADEMARK OFFICE
CERTIFICATE OF CORRECTION

PATENT NO. : 5,635,431
DATED : June 3, 1997
INVENTOR(S) : Isao Ikeda et al

It is certified that error appears in the above-indentified patent and that said Letters Patent is hereby corrected as shown below:

Claim 1, Column 8, Line 12, "$MgO.Al_2O_3$" should read --$MgO \cdot Al_2O_3$--.

Claim 2, Column 8, Line 22, "$MgO.Al_2O_3$" should read --$MgO \cdot Al_2O_3$--.

Claim 3, Column 8, Line 25, "$MgO.Al_2O_3$" should read --$MgO \cdot Al_2O_3$--.

Claim 5, Column 8, Line 34, "$MgO.Al_2O_3$" should read --$MgO \cdot Al_2O_3$--.

Claim 6, Column 8, Line 38, "$MgO.Al_2O_3$" should read --$MgO \cdot Al_2O_3$--.

Signed and Sealed this

Sixteenth Day of December, 1997

Attest:

BRUCE LEHMAN

*Attesting Officer*     *Commissioner of Patents and Trademarks*